Dec. 27, 1938.  C. C. STREET  2,141,627
GAUGE OR INDICATOR
Filed Aug. 5, 1937
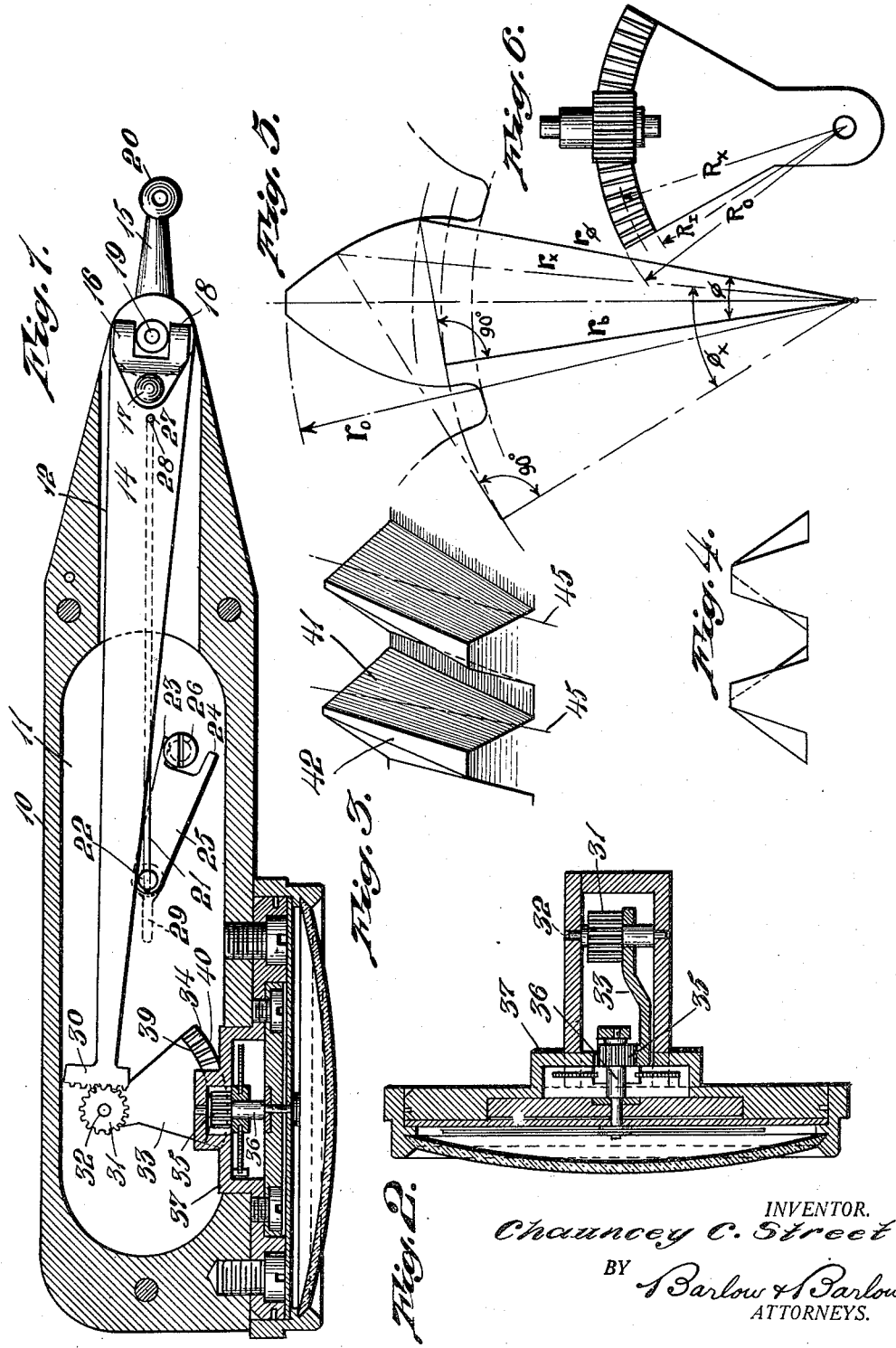
INVENTOR.
Chauncey C. Street
BY Barlow & Barlow
ATTORNEYS.

Patented Dec. 27, 1938

2,141,627

UNITED STATES PATENT OFFICE 2,141,627

GAUGE OR INDICATOR

Chauncey C. Street, Providence, R. I., assignor to Federal Products Corporation, a corporation of Rhode Island Application August 5, 1937, Serial No. 157,520

10 Claims. (Cl. 74—459.5)

This invention relates to gauges and instruments of the indicating type, both of which I intend to include by the term indicator; and the invention has for one of its objects the provision of a means for transmitting velocity accurately in directions at an angle to each other, such for instance as at right angles.

Another object of the invention is to provide in a gear train which transmits motion about axes at an angle to each other, an arrangement by which velocity will be accurately transmitted that all increments of movement occurring in one plane will be accurately transmitted in a different plane.

Another object of the invention is the provision of the accurate transmission of velocity occurring about one axis to some member moving about an axis at an angle thereto in gearing which is exceedingly small and one which may be produced in a practical manner without excessive costs.

Another object of the invention is to produce an accurate angular transfer of velocity in two different directions at an angle to each other both in the same plane in which the gears will be so small that commercial bevel gears or spiral gears would not be accurate but at best would be only close approximations.

Another object of the invention is to provide a gearing which will compensate for the different speeds of the outside and inside diameters of the crown gear by varying the tooth contour of the crown gear to compensate for these different speeds.

Another object of the invention is to provide a pinion meshing with the crown gear in which the teeth of the crown gear will be the conjugate of the shape of the teeth of the pinion for the accurate transmission of velocity from one to the other.

With these and other objects in view, the invention consists of certain novel features of construction, as will be more fully described, and particularly pointed out in the appended claims.

In the accompanying drawing:

Fig. 1 is a sectional view of a dial test indicator in which this invention is applied;

Fig. 2 is a sectional view of the structure of Fig. 1, on a section taken substantially through the center of the dial and showing the related parts;

Fig. 3 is a projected view showing the shape of the end flanks and tops of the teeth of the crown gear with the teeth being tipped upward thirty degrees and rotated fifteen degrees;

Fig. 4 shows an end view of the inside of the ends of the teeth of the crown gear and the ends of the outside of the crown gear showing their relative relationship looking along the radial extent of the tooth;

Fig. 5 shows the shape of a cross section of the pinion tooth; and

Fig. 6 is a top plan view of a segmental portion of the crown gear showing the pinion as meshing therewith.

In the use of indicators it is frequently desirable to transmit motion through some angle, often a right angle, for the convenience of observing the movement which is to be indicated, and in such transmission of motion additional problems are encountered. It is found, however, that accurate transfers of velocity, especially where the parts are very small, is not obtained by reason of beveled gears and can be obtained with spiral gears only at such expense as to make the securing of such accuracy commercially impracticable. Further, in the use of spiral gears high magnification is not possible because of the pressures and friction which are encountered. Accordingly, in order that an indicator may measure with greater accuracy and with an unlimited magnification of movement I have provided a gear train for transmitting motion through a right angle, or in fact, any angle whereby there is an accurate transfer of velocity, which I accomplish by providing a pinion spur gear, each tooth of which is of a uniform section, usually of an involute shape, and a crown gear which meshes therewith, the teeth of which are so shaped that the flanks of the teeth will be conjugate to the teeth of the spur gear so that any angular velocity which occurs in one gear will be accurately transmitted to the other gear with the result that very fine indications may be had by reason of a true and faithful transfer of the motion being provided, and this I accomplish by calculating the pressure angle on the flank teeth incrementally across the flank so that the accurate transmission of motion may be had, and the following is a more detailed description of the present embodiment of this invention, illustrating the preferred means by which these advantageous results may be accomplished:

The details of the particular instrument in which this gear train is provided are unimportant and certain of the parts are described in greater detail in my co-pending application, Serial No. 74,344, filed April 14, 1936. In general, a body casing 10 is provided with a recess 11 for housing certain mechanism of the indicator. From this recess there is also provided a slot 12 in which a lever is movably pivoted. This lever consists of two parts 14 and 15 relatively movable and held in certain relative positions by friction caused by spring member 16 riveted as at 17 to the lever and having spring arms 18 to engage portions of the lever 15 and hold it firmly against the lever portion 14. A pin 19 is fixed in the lever and is mounted in suitable bearings in the casing or body 10 and also in the cover plate which forms the other part of the casing. This lever may therefore rock about the pivot 19 as an axis in response to movements of its ball or rounded end 20 when contacting with some work.

A spring 21 is fixed in a pin 22 which is rockable within limits provided by the member 25 fixed to the pin 22 and having the arms 23 and 24 between which is located the screw 26. This spring has a bent-up end 27 which enters a hole 28 in the portion 14 of the lever and urges this lever in one direction or the other depending whether the arm 23 or 24 is in engagement with the screw 26. Pin 22 and member 25 may be swung from one side to the other to cause the arm 23 or 24 to engage the screw by means of a handle 29 fixed to the pin and extending to a position outside of the casing.

A gear segment 30 is formed on the end of the lever portion 14 and meshes with a pinion 31 fixed on a pin 32 having bearings in the casing and in the cover. This pinion is fixed to the segment 33 which has a crown gear 34 cut thereon, which crown gear in turn meshes with the pinion 35 on the staff 36 of the dial, which may be a complete unit 37 with a slot cut in its housing for the gear segment 33 to move therethrough.

No difficulty is experienced in the transfer of motion from the lever with the gear segment 30 thereon to the pinion 31 so as to move the segment 33. However, there is difficulty encountered in the transmission of accurate velocity from the gear segment 34' to the pinion 35 in order to rotate the staff 36 and the dial or pointer, whichever may be caused to move in the obverse part of the unit 37. Bevel or spiral gears will not supply this need as above mentioned. The teeth of the pinion 35 and the teeth 34 of the crown gear segment I form so that one will be the conjugate of the other. In other words, the shape should be such that there will be an accurate transmission of velocity from one to the other, and I provide such shaping of teeth as is necessary all on the crown gear. Pinions having teeth of various shapes may be chosen for this purpose and for illustration I have chosen a pinion 35, each of the teeth of which is a regular involute, such as illustrated by a section at right angles to the axis of the gear through one of the teeth, as shown in Fig. 5. The edges or face of each tooth of this gear is parallel to the axis of the shaft 36, the pinion is of a known and regular form for simplicity of manufacture with such shaping as is necessary in order to provide a uniform velocity transfer, occurring in the shape of the teeth 34 of the crown gear.

It is well known that the inside ends of the radially extending teeth of the crown gear 34, which I will designate 39, will travel at a different speed than the outside ends of the teeth on the arc of the line 40. Consequently, in order to obtain a faithful and accurate transfer of velocity I provide a shaping of each tooth of the crown gear so that the angles of the opposite flanks on the arc represented by the line 39 will be different than the shapes on the arc of the line represented by 40, this difference being in accordance with a calculation which will determine the pressure angle for each radius, such as 39 or 41 or intermediate radii, which may occur throughout the radial extent of the tooth. I thus get a flank 41 which is shaped as indicated in Fig. 3. The flank will be slightly concave although this will be so slight that I have not attempted to show the concavity in the flank of the drawing. This arrangement also causes the edges 42 of the teeth of the gear to be tapered, that is, they will be wider at the inner edge of the gear than at the outer edge thereof, as also illustrated in Fig. 3. The true projection looking at the ends of the teeth is shown in Fig. 4. Another manner of visualizing the shape of the crown gear teeth would be to visualize the teeth as being of a soft formation which as the segment is turned at a uniform velocity with the pinion would be shaped by the impression of the teeth of the pinion in the crown gear. This I term a conjugate shape of the teeth.

The calculation of the pressure angle for any particular radius of the tooth of the crown gear is a mathematical relation which will be represented as follows:—

The pressure angle of the meshing portions of the pinion and crown gear must be the same, therefore we can solve for the pressure angle of the crown gear by finding the relative angle at the conjugate point on the pinion.

The relation, $$r_x = \frac{R_x \, n}{N}$$

must be held at all times.

The base radius of the pinion is given by:

$$r_b = \frac{n \cos \phi}{2}$$

The pressure angle at any radius $r_x$ is given by:

$$\cos \phi_x = \frac{r_b}{r_x}$$

By combining the above formulas and equating to $\phi_x$ we have:

$$\cos \phi_x = \frac{N \cos \phi}{2 R_x}$$

$r_x$ = any assigned radius on a pinion.
$R_x$ = any assigned radius on the crown gear.
$n$ = number of teeth in pinion.
$N$ = number of teeth in crown gear.
$\phi$ = basic rack pressure angle.
$\phi_x$ = pressure angle at any radius $r_x$ or $R_x$.
$r_b$ = base radius of pinion.

These designations are illustrated in the drawing.

This method of calculation indicates that the tooth flank is straight. This is not exactly true but the approximation as shown here is so nearly exact that the concavity of the tooth may be neglected except where the highest refinements are necessary. Since the mathematical explanation to show this concavity is so highly involved and does not clearly enhance an explanation, it is omitted.

This crown gear is moving as the cutter operates, while the cutter is substantially the shape of the pinion which meshes with it and is turning likewise as it reciprocates to cut the flanks of the teeth one at a time.

The shape of the tooth will be such that the teeth will be in contact all of the time and thus the continuity will be equal to in excess of one. One continuity which has been found satisfactory is 1.4. The teeth of the pinion although usually of the same extent as the radial extent of the teeth 34 of the crown gear will not contact throughout this width when any one tooth of the pinion is in engagement with any one tooth of the crown gear but rather engagement will occur at a series of points travelling across the flank 41 of the crown gear, such as may be represented by the line 45 drawn across the flank, as shown in Fig. 3.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an indicator, means for transmitting motion in two planes comprising a pinion spur gear, and a crown gear meshing therewith, the teeth of the crown gear being radial thereof of a shape which is conjugate to the shape of the teeth of the spur gear.

2. In an indicator, means for transmitting motion in two planes comprising a pinion spur gear, and a crown gear meshing therewith, the teeth of the crown gear being radial thereof and of a shape which is conjugate to the shape of the teeth of the spur gear, the continuity of the teeth being at least one.

3. In an indicator, means for transmitting motion in two planes comprising a pinion spur gear, and a crown gear meshing therewith, the teeth of the crown gear being radial thereof and of a shape which is conjugate to the shape of the teeth of the spur gear, the continuity of the teeth being greater than one.

4. In an indicator, means for transmitting motion in two planes which are at right angles to each other, comprising a pinion spur gear, and a crown gear meshing therewith, the teeth of the crown gear being radial thereof and of a shape which is conjugate to the shape of the teeth of the spur gear.

5. In an indicator, means for transmitting motion in two planes comprising a pinion spur gear, the teeth of which are of a uniform shape in different planes at right angles to the axis of the gear, and a crown gear meshing therewith, the teeth of the crown gear being radial thereof and of a shape which is different in each different plane at right angles to a radius from the axis of the gear and which is conjugate to the shape of the teeth of the spur gear.

6. In an indicator, means for transmitting motion in two planes comprising a pinion spur gear, and an arcuate crown gear meshing therewith, the teeth of the crown gear being radial thereof of a shape which is conjugate to the shape of the teeth of the spur gear whereby to accurately transmit angular velocity from one gear to the other.

7. In an indicator, means for transmitting motion in two planes comprising a pinion spur gear, the teeth of which are of a uniform shape in different planes at right angles to the axis of the gear, and a crown gear meshing therewith, the teeth of the crown gear being radial thereof and of a shape which is different in each different plane at right angles to a radius from the axis of the gear with the flanks of the teeth steeper nearer the axis than at the outer part thereof and which is conjugate to the shape of the teeth of the spur gear.

8. In an indicator, means for transmitting motion in two planes comprising a pinion spur gear, the teeth of which are of a uniform shape in different planes at right angles to the axis of the gear, and a crown gear meshing therewith, the teeth of the crown gear being radial thereof and of a shape which is different in each different plane at right angles to a radius from the axis of the gear with the flanks of the teeth progressively steeper as they approach the axis of the crown gear, and which is conjugate to the shape of the teeth of the spur gear.

9. In an indicator, means for transmitting motion in two planes comprising a pinion spur gear, a crown gear meshing therewith, the teeth of the spur gear being uniform axially of the gear and the teeth of the crown gear being radial thereof and changing shape progressively radially outwardly from the axis of the crown gear throughout their width with the change in shape compensating for the change in speed of points on the spur gear teeth whereby to accurately transmit angular velocity from one gear to the other.

10. In an indicator, means for transmitting motion in two planes at right angles to each other, comprising a pinion spur gear, a crown gear meshing therewith, the teeth of the spur gear being uniform axially of the gear and the teeth of the crown gear being radial thereof and changing shape progressively radially outwardly from the axis of the crown gear throughout their width with the change in shape compensating for the change in speed of points on the spur gear teeth whereby to accurately transmit angular velocity from one gear to the other.

CHAUNCEY C. STREET.